US009274241B2

(12) United States Patent
Lindqvist et al.

(10) Patent No.: US 9,274,241 B2
(45) Date of Patent: Mar. 1, 2016

(54) METHOD AND SYSTEM FOR SUPPRESSING SWELL-INDUCED ELECTROMAGNETIC NOISE

(71) Applicant: PGS Geophysical AS, Lysaker (NO)

(72) Inventors: Ulf Peter Lindqvist, Segeltorp (SE); Andras Robert Juhasz, Stockholm (SE); Rune Johan Magnus Mattsson, Trångsund (SE); Lars Erik Magnus Björnemo, Knivsta (SE)

(73) Assignee: PGS Geophysical AS, Oslo (NO)

( * ) Notice: Subject to any disclaimer, the term of this patent is extended or adjusted under 35 U.S.C. 154(b) by 364 days.

(21) Appl. No.: 13/828,239

(22) Filed: Mar. 14, 2013

(65) Prior Publication Data

US 2014/0266216 A1    Sep. 18, 2014

(51) Int. Cl.
*G01V 3/00* (2006.01)
*G01V 3/12* (2006.01)
*G01V 3/08* (2006.01)
*G01V 3/15* (2006.01)

(52) U.S. Cl.
CPC . *G01V 3/12* (2013.01); *G01V 3/083* (2013.01); *G01V 3/15* (2013.01)

(58) Field of Classification Search
CPC .......... G01V 3/083; G01V 3/12; G01V 3/38; G01V 3/15; G01V 3/165; G01V 1/189; G01V 1/201; G01V 1/3808; G01V 2210/6163; G01V 2003/086; G06F 19/00; G01R 33/022
USPC .................... 324/329, 333–366, 613; 702/17; 367/15, 21, 106, 124, 130
See application file for complete search history.

(56) References Cited

U.S. PATENT DOCUMENTS

| 2,839,721 | A | * | 6/1958 | De Witte | G01V 3/06 324/365 |
| 4,486,864 | A | * | 12/1984 | Ongkiehong | G01V 1/3808 181/107 |
| 4,617,518 | A | * | 10/1986 | Srnka | G01V 3/06 324/364 |

(Continued)

FOREIGN PATENT DOCUMENTS

WO    WO 2007089486 A2 *  8/2007    ............. G01V 3/083

OTHER PUBLICATIONS

Peter Krylstedt, et al, "Numerical Modelling of Electromagnetic Frequency Sounding in Marine Environments: A Comparison of Local Optimisation Techniques," Marine Electromagnetic Conference (MARELEC) Conference Proceedings, Jun. 2001, Stockholm, Sweden.

(Continued)

*Primary Examiner* — Patrick Assouad
*Assistant Examiner* — Sean Curtis

(57) ABSTRACT

Disclosed are methods and systems for suppression of noise in electromagnetic surveying that includes stacking two or more frames of electromagnetic data. An example embodiment discloses a method for suppressing swell-induced noise in an electromagnetic survey, comprising: measuring an electromagnetic field parameter at one or more positions to provide an electromagnetic signal, the electromagnetic signal comprising a swell-induced portion; and stacking two or more frames of the electromagnetic signal to provide a stacked signal in which the swell-induced portion is suppressed, wherein the swell-induced portion is out of phase between the two or more frames.

20 Claims, 6 Drawing Sheets

(56) References Cited

U.S. PATENT DOCUMENTS

| | | | |
|---|---|---|---|
| 5,818,795 A | 10/1998 | Hawkins et al. | |
| 5,930,731 A | 7/1999 | Brzostowski | |
| 6,529,445 B1* | 3/2003 | Laws | G01V 1/364 367/151 |
| 6,751,559 B2* | 6/2004 | Fookes | G01V 1/3808 367/20 |
| 6,876,599 B1* | 4/2005 | Combee | G01V 1/364 367/20 |
| 6,906,981 B2* | 6/2005 | Vaage | G01V 1/3808 181/110 |
| 7,035,737 B2 | 4/2006 | Ren | |
| 7,042,801 B1* | 5/2006 | Berg | G01V 1/00 324/323 |
| 7,126,338 B2* | 10/2006 | MacGregor | G01V 3/12 324/334 |
| 7,142,481 B1 | 11/2006 | Metzbower et al. | |
| 7,203,599 B1* | 4/2007 | Strack | G01V 3/083 324/354 |
| 7,239,577 B2* | 7/2007 | Tenghamn | G01V 1/181 174/101.5 |
| 7,382,682 B2 | 6/2008 | Zerouk | |
| 7,565,245 B2* | 7/2009 | Andreis | G01V 3/12 702/7 |
| 7,574,410 B2* | 8/2009 | Strack | G01V 3/083 706/21 |
| 7,646,671 B2 | 1/2010 | Pan | |
| 7,671,598 B2* | 3/2010 | Ronaess | G01V 1/201 324/365 |
| 7,705,599 B2* | 4/2010 | Strack | G01V 3/12 324/323 |
| 7,835,225 B2* | 11/2010 | Sollner | G01V 1/3808 367/24 |
| 7,957,904 B2* | 6/2011 | Ziolkowski | G01V 3/083 702/104 |
| 8,026,723 B2* | 9/2011 | Loehken | G01V 3/083 324/350 |
| 8,035,393 B2* | 10/2011 | Tenghamn | G01V 3/083 324/347 |
| 8,131,522 B2* | 3/2012 | Ziolkowski | G01V 3/12 324/334 |
| 8,188,748 B2* | 5/2012 | Schaug-Pettersen | G01V 3/12 324/334 |
| 8,963,549 B2* | 2/2015 | Combee | G01V 3/083 324/365 |
| 2003/0050759 A1* | 3/2003 | Srnka | G01V 3/083 702/7 |
| 2008/0143335 A1* | 6/2008 | Reddig | G01V 3/083 324/323 |
| 2009/0243617 A1* | 10/2009 | Farrelly | G01V 3/12 324/337 |
| 2009/0265111 A1* | 10/2009 | Helwig | G01V 3/12 702/7 |
| 2009/0279387 A1* | 11/2009 | Tenghamn | G01V 1/3808 367/21 |
| 2010/0002539 A1* | 1/2010 | Kragh | G01V 1/364 367/23 |
| 2010/0017156 A1* | 1/2010 | Ziolkowski | G01V 3/02 702/65 |
| 2010/0057366 A1* | 3/2010 | Wright | G01V 3/12 702/11 |
| 2010/0060286 A1* | 3/2010 | Summerfield | G01V 3/12 324/334 |
| 2010/0074049 A1* | 3/2010 | Kragh | G01V 1/3808 367/16 |
| 2010/0233955 A1* | 9/2010 | Hornbostel | G01V 3/083 455/40 |
| 2010/0271029 A1* | 10/2010 | Fainberg | G01V 3/12 324/334 |
| 2011/0013481 A1* | 1/2011 | Clark | G01R 33/022 367/15 |
| 2011/0087435 A1* | 4/2011 | Hornbostel | G01V 3/083 702/13 |
| 2012/0010818 A1* | 1/2012 | Kalish | G01V 3/12 702/6 |
| 2012/0146649 A1* | 6/2012 | Combee | G01V 3/083 324/337 |
| 2012/0179372 A1* | 7/2012 | Kalish | G01V 3/38 702/2 |
| 2012/0191352 A1* | 7/2012 | Kjerstad | G01V 3/12 702/6 |
| 2012/0236684 A1* | 9/2012 | Juhasz | G01V 3/083 367/20 |
| 2012/0253680 A1* | 10/2012 | Thompson | G01V 11/007 702/13 |
| 2012/0280690 A1* | 11/2012 | Ziolkowski | G01V 3/12 324/338 |
| 2013/0113489 A1* | 5/2013 | Guigne | G01V 3/12 324/334 |
| 2013/0135966 A1* | 5/2013 | Rommel | G01V 1/3808 367/24 |
| 2013/0250720 A1* | 9/2013 | Monk | G01V 1/3861 367/20 |
| 2014/0153363 A1* | 6/2014 | Juhasz | G01V 3/083 367/24 |
| 2014/0241117 A1* | 8/2014 | Dellinger | G01V 1/3808 367/15 |

OTHER PUBLICATIONS

Peter Krylstedt, et al, "A Sequential Approach to Inverse Modelling in Marine Electromagnetics: Recovering the Conductivity Profile from Measurements of the Electromagnetic Field," Marine Electromagnetic Conference (MARELEC) Conference Proceedings, Jun. 2001, Stockholm, Sweden.

Pamela F. Lezeate et al., "Correction of Shallow-Water Electromagnetic Data for Noise Induced by Instrument Motion," Geophysics, Sep. 9, 2005, pp. G127-G133, vol. 70, No. 5.

Alan D. Cave and Charles S. Cox, "Controlled Electromagnetic Sources for Measuring Electrical Conductivty Beneath the Oceans," Journal of Geophysical Research, Jul. 10, 1982, pp. 5327-5338, vol. 87, No. B7.

Johan Mattsson, et al., "Error Analysis and Capability Modelling for Towed Streamer Electromagnetics," First Break, Aug. 2012, pp. 91-96, vol. 30.

Johan Mattsson, et al., "Towed Streamer EM: The Challenges of Sensitivity and Anisotropy" First Break, Jun. 2013, pp. 155-159, vol. 31.

Chris Anderson, et al., "An Integrated Approach to Marine Electromagnetic Surveying Using a Towed Streamer and Source" First Break, May 2010, pp. 71-75, vol. 28.

* cited by examiner

METHOD AND SYSTEM FOR SUPPRESSING SWELL-INDUCED ELECTROMAGNETIC NOISE

BACKGROUND

The present invention relates to suppression of noise in electromagnetic surveying and, more particularly, to a method and system for suppression of swell-induced electromagnetic noise that includes stacking two or more frames of electromagnetic data.

One type of marine geophysical surveying includes electromagnetic ("EM") surveying, in which geophysical data may be collected from below the Earth's surface. Marine EM surveying is used, among other purposes, to infer spatial distribution of electrical conductivity of rock formations below the bottom of a body of water, such as a lake or ocean. The spatial distribution of conductivity is used to assist in determining the presence of hydrocarbon-bearing rock formations in the subsurface, potentially resulting in cost saving by better targeted drilling operations. One type of such surveying is known as "controlled source" electromagnetic ("CSEM") surveying, which generally includes inducing a time-varying EM field in the subsurface formations and measuring one or more parameters related to a response of the subsurface rock formations to the induced EM field. More particularly, CSEM surveying may use a controlled source that sends current between two electrodes. The current may diffuse through the sea water and subsurface formation with an electric potential difference caused by the current measured at some distance away from the source. The sensitivity of the potential difference to resistive anomalies in the subsurface formation, for example, a hydrocarbon reservoir, depends on the sensor offset and the source signal frequency. The ability to detect resistive anomalies at depth may be limited by a combination, of sensitivity to the anomalies and the signal-to-noise ratio.

One source of noise that may decrease the signal-to-noise ratio and, thus, limit the ability to detect resistive anomalies is swell. Swell is a highly synchronized wave motion of possibly high amplitude. Swell waves in a fully developed sea are minimally affected by local wind, but rather have outrun the storm that created them, lengthening and reducing in height in the process. Swells typically organize into groups smooth and regular in appearance. They are able to travel thousands of miles unchanged in height and period. At shallow and intermediate depths at sea, swell may be a major source of noise in EM surveying, such as CSEM surveying. The swell-induced noise may be particularly pronounced in water depths less than a few hundred meters. Swell typically may create noise in the approximate frequency range of 0.05 Hz to 0.1 Hz, which may coincide with the typical frequency range of optimal sensitivity to deep anomalies. Accordingly, data quality of the EM survey may be negatively impaired where significant swell is present. As result, EM surveys may be impracticable in some instances, thus limiting the weather window for EM surveys. For example, swell-induced noise may be a limiting factor on the height of the swells in which the survey vessel can operate.

Accordingly, there is a need for improved methods and systems for suppressing, swell-induced noise in EM surveying, for example, to improve data quality and enlarge the weather window for EM surveys.

BRIEF DESCRIPTION OF THE DRAWINGS

These drawings illustrate certain aspects of some of the embodiments of the present invention and should not be used to limit or define the invention.

DETAILED DESCRIPTION

The present invention relates to suppression of noise in electromagnetic surveying and, more particularly, to a method and system fir suppression of swell-induced electromagnetic noise that includes stacking two or more frames of electromagnetic data. One of the many potential advantages of the methods and systems of the present invention, only some of which are disclosed herein, is that data quality from an EM survey may be improved by suppression of swell-induced EM noise. In particular, the signal-to-noise ratio in the desired frequency range may be increased by suppression of swell-induced EM noise. Yet another potential advantage is that the weather window for EM surveys may be enlarged as the EM survey may be performed in weather conditions that would have otherwise been impracticable due to swell-induced noise.

Figure 1:
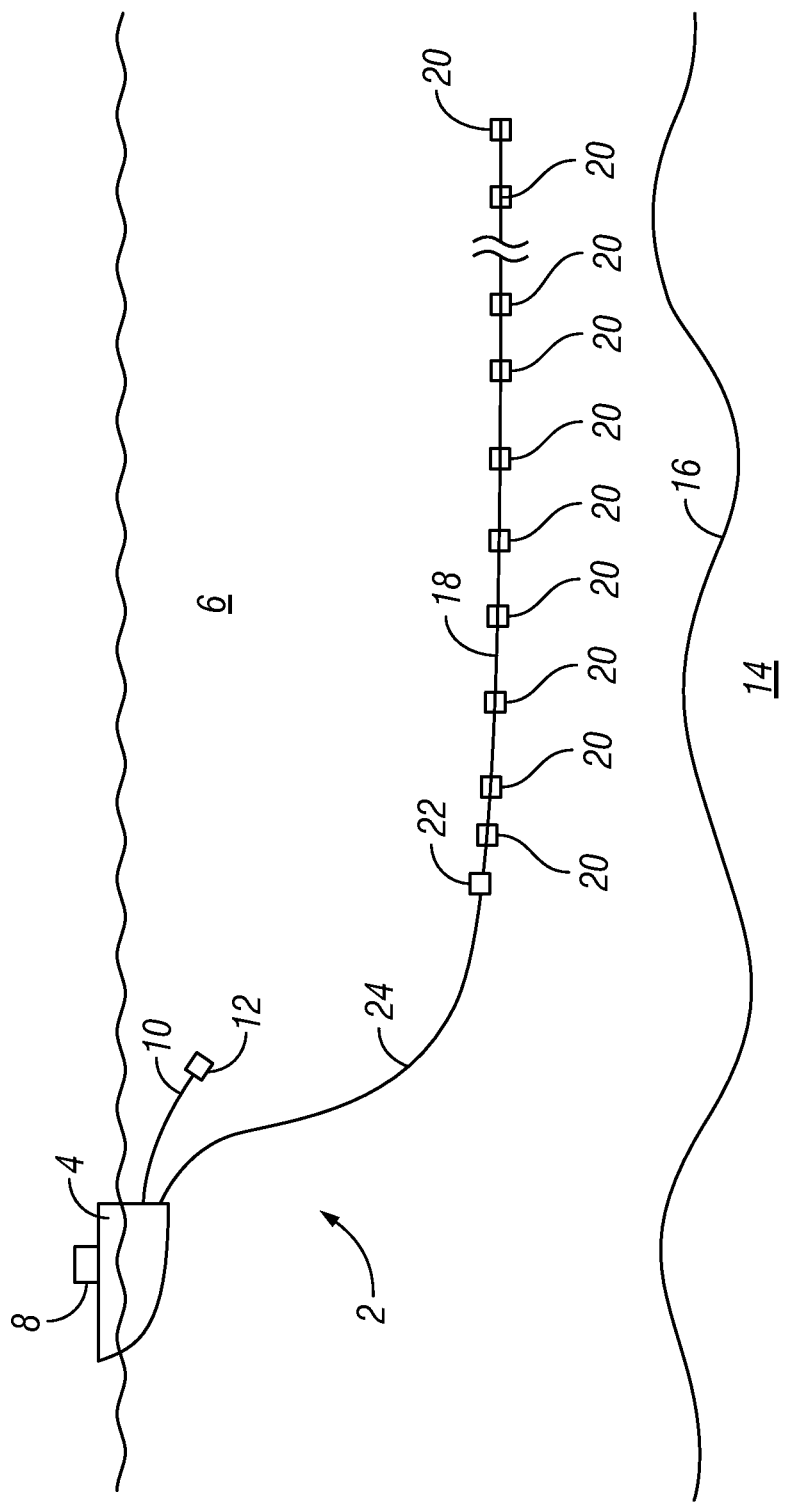
FIG. 1 shows an example embodiment of a marine EM survey system.

Referring now to FIG. 1, a marine EM survey system 2 is illustrated in accordance with example embodiments. As illustrated, the marine geophysical survey system 2 may include a survey vessel 4 moving along the surface of a body of water 6, such as a lake or ocean. The survey vessel 4 may include thereon equipment, shown generally at 8 and referred to for convenience as a "recording system." The recording system 8 typically may include devices (none shown separately) for navigating the survey vessel 4, such as global positioning system ("GPS") receivers, for actuating at least one EM energy source 12, and for recording signals generated by the EM sensors 20.

The survey vessel 4 or a different vessel (not shown) may tow a source cable 10 through the body of water 6. As illustrated, the source cable 10 may include at least one EM energy source 12. In the illustrated embodiment, the energy source 12 is towed above the water bottom 16, wherein the energy source 12 is disconnected from the water bottom 16. The energy source 12 may be any selectively actuable sources suitable for subsurface EM surveying, such as one or more EM field transmitters. The energy source 12 may be towed in any suitable pattern for EM surveying, including in a parallel or orthogonal pattern, or possibly a circular or spiral pattern. At selected times, the energy source 12 may be actuated to generate an EM field that travels downwardly through the body of water 6 and rock formations 14 below the water bottom 16.

The survey vessel 4 may further tow a sensor streamer 18 having thereon at longitudinally spaced apart positions a plurality of EM sensors 20. In the illustrated embodiment, the sensor streamer 18 is shown being towed by the survey vessel 4 moving on the surface of the body of water 6. In alternative embodiments, the sensor streamer 18 may alternatively be deployed on or near the water bottom 16 or towed by another vessel (not shown). As another alternative, one or more additional sensor streamers (not shown) may be towed behind the survey vessel 4, towed behind another vessel (not shown), or deployed at or near the water bottom 16. The invention may also be used with sensor nodes not shown), for example, static nodes disposed on or near the water bottom 16. The type(s) and configurations(s) of the EM sensors 20 are not intended to limit the scope of the invention. Without limitation, the EM sensors 20 may be used, for example, to measure the EM response of the rock formations 14 below the water bottom 16. The EM sensors 20 may measure one or more various electric field properties, such as voltage, magnetic field amplitude, and/or magnetic field gradient.

The sensor streamer 18 may be formed, for example, by coupling a plurality of streamer segments end-to-end as explained in U.S. Pat. No. 7,142,481, the disclosure of which is incorporated herein by reference. The sensor streamer 18 may be coupled at its forward end (with respect to direction of movement of the survey vessel 4) to a termination 22 which couples the sensor streamer 18 to a lead-in cable 24. The lead-in cable 24 may transmit towing force, power, and/or signals between the survey vessel 4 and the sensor streamer 18. While not illustrated, the sensor streamer 18 may include a number of different devices in addition to the EM sensors 20 include, for example lateral force and depth control devices (e.g., birds having variable incidence wings) to regulate streamer depth, seismic sensors, depth sensors, velocity sensors, and/or positions sensors, among others. While only a single sensor streamer 18 is shown, it should be understood that the invention is applicable to any number of sensor streamers 18 towed by survey vessel 4 or any other vessel. For example, in some embodiments, two or more sensor streamers 18 may be towed by survey vessel 4, spaced apart in depth or laterally. "Lateral" or "laterally," in the present context, means transverse, to the direction of the motion of the survey vessel 3. Lateral positioning of the streamers 4 may be maintained by various towed devices (e.g., deflectors, paravanes, doors, etc.) that can generate lateral three as moved through the body of water 6. In some embodiments, up to twenty-six sensor streamers 18 may be towed by survey vessel 4. For example, embodiments may include towing from three to ten sensor streamers 18 from the survey vessel 4. Accordingly, the number of sensor streamers 18 and their particular geometric configuration in the body of water 6 is not considered a limitation on the scope of the present invention.

As previously described, the EM sensors 20 may be used to measure various electric field properties of the EM field generated as a result of the interaction of the induced EM field with the rock formations 14 below the water bottom 16. The measurement may be of induced voltage and/or magnetic field, such that the measured EM signals represent one or more EM field properties. It should be appreciated by those of ordinary skill in the art with the benefit of this disclosure that swell may be significant source of noise in the measured data from an EM survey. Swell-induced noise may be particularly problematic because is can be of high amplitude and may be in the approximate frequency range of 0.05 Hz to 0.1 Hz, which may coincide, with the optimal frequency range for the EM survey. It has been observed that the noise level in a towed EM system may increase by as much as 20 decibels in a limited frequency range due to swell.

To suppress swell-induced noise in the EM data, embodiments of the present invention may stack two or more frames of EM data from repeated measurements. Swell is a large synchronized water motion with slow/weak temporal and spatial variability in its characteristics. The resulting, EM noise inherits these temporal and spatial properties. As used herein, swell-induced noise indicates any noise in an EM signal, or portion thereof, detected by EM sensors with narrowband frequency characteristics (typically about 0.01 to 0.2 Hz) and potentially large amplitude (e.g., up to 0.1 mV/m/$Hz^{1/2}$). In some embodiments, the sets a EM data may be for "source-on time frames." The phrase "source-on time frame" refers to a period of time in the EM survey when the energy source 12 is on and generating an EM field. Each frame that is stacked may contain EM data. The stacking of the EM data frames refers to combining two or more frames of EM data from repeated measurements. For example, stacking may include adding all datum 1 in all frames, all datum 2 in all frames, until datum N in all frames has been added, wherein there is N data in a frame. Stacking may comprise averaging the summed data by dividing the summed data by the number of frames. By stacking, features that are common between the data frames may be enhanced while features that vary between the data frames may be suppressed. The swell-induced noise may be suppressed by stacking because the swell has a fairly defined frequency of significant coherence of time. Incoherent (zero-mean) noise may be typically suppressed with a factor of sqrt(N) by stacking, wherein there are N data frames. However, the success of stacking may depend on the swell phase between data frames. For example, coherent noise may either be suppressed or enhanced by stacking, depending on the relative phase between data frames. The detected EM signal may comprise a swell-induced portion. By stacking two data frames with the swell-induced portion 180-degrees out of the phase for two-frame stacking or three data frames with swell-induced, portion 120-degrees out of phase for three frame stacking, the swell may be effectively suppressed. In effect, the swell signal cancels itself out by stacking, in contrast, if the swell signal is in-phase between the stacked data frames, no suppression should occur. In some embodiments, the stacked data frames may be of an equal length. The stacking of EM data frames may be performed over any dimension (e.g., sensor offset). For example, the stacking of data frames may be performed over time frames of EM data.

A number of different techniques may be used for stacking of data frames to suppress swell-induced noise. According to one example method, two or more data frames may be averaged to suppress swell-induced noise. By way of example, embodiments may include averaging regular sequences of measured data with each sequence including two or more source-on time frames of data. This example method may be particularly effective if the swell signal in successive source-on time frames is 180-degrees out of phase. However, this example method may not always be efficient because the swell-induced portion does not necessarily cancel itself out. For example, when the swell-induced portion is in-phase between successive source-on time frames no suppression occurs. Embodiments of the techniques for suppressing swell-induced noise may use a computer system (e.g., computer system 62 of FIG. 8) for implementing one or more steps of the methods described herein.

Figure 2:
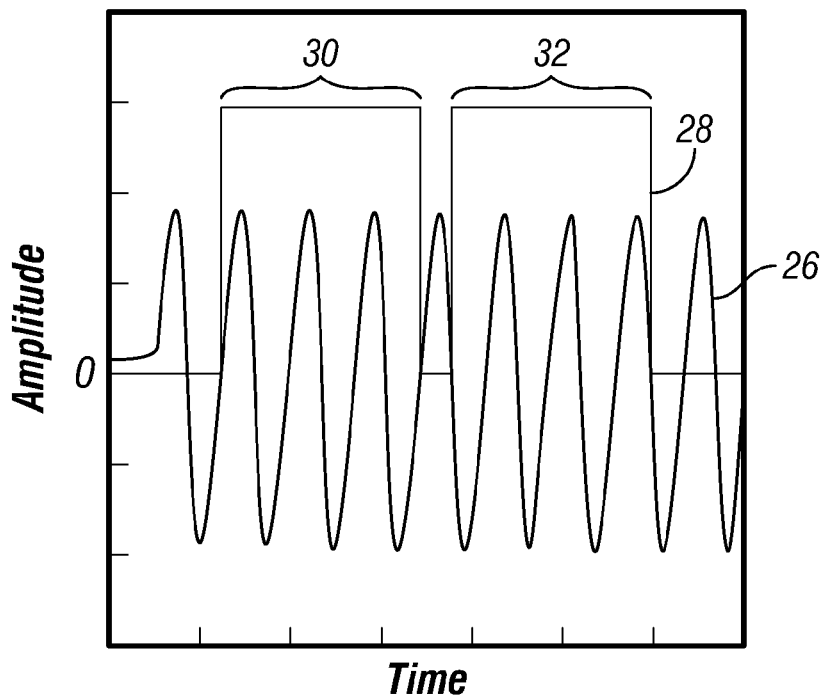
FIG. 2 shows an example graph of a swell-generated signal.

FIGS. 2-5 illustrate an example technique in which source-on time frames of data may be averaged to suppress swell-induced noise in accordance with embodiments of the present invention. FIG. 2 shows an example graph of a hypothetical swell-induced portion 26 of an EM signal. The swell-induced portion 26 may represent, for example, induced voltages from swell in one or more EM sensors (e.g., EM sensors 20 of FIG. 1). As illustrated, the swell-induced portion 26 has a fairly well-defined frequency. For clarity, the source-generated portion of the EM signal is not shown on FIG. 2. However, line 2 on FIG. 2 is used to give an indication when the source is on with a first source-on time frame shown at 10, and to second source-on time frame shown at 32. The swell-induced portion 26 is from 150-degrees to 180-degrees out of phase between the first source-on time frame 30 and the second source-on time frame 32.

Figure 3:
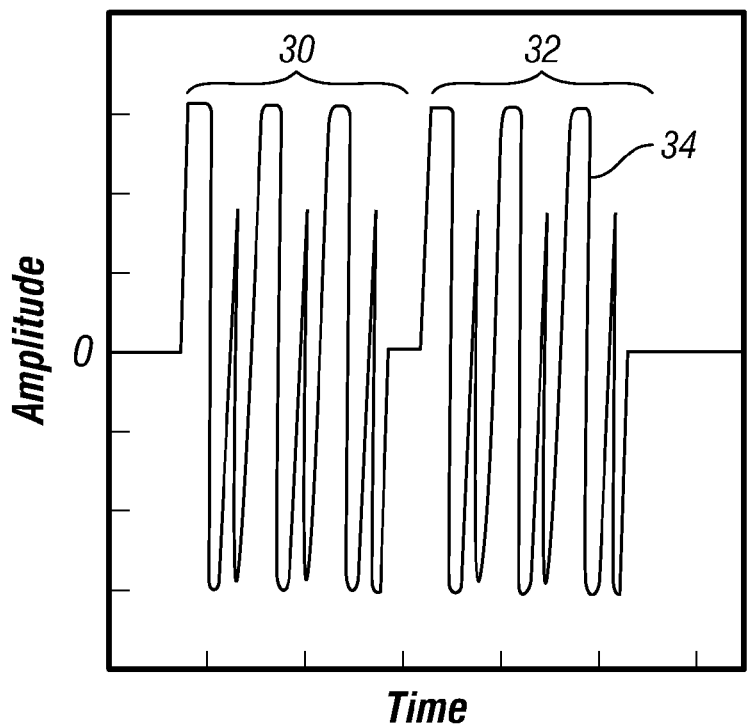
FIG. 3 shows an example graph of a source-generated signal.

FIG. 3 shows an example graph of a hypothetical source-induced portion 34 of the EM signal. The source-induced portion 34 is shown as a smooth transition due to filtering by inductance in the source cable (e.g., source cable 10 of FIG. 1) and water resistivity even where the output current at the EM energy source EM energy source 12 of FIG. 1) varies between two levels. Shown in this example graph are two time frames, first source-on time frame 30 and second source-on time frame 32 with a silent period in between where the EM energy source was off. In alternative embodiments not shown), the source-induced portion 34 may be a square wave with no silent periods in between the two time frames.

Figure 4:
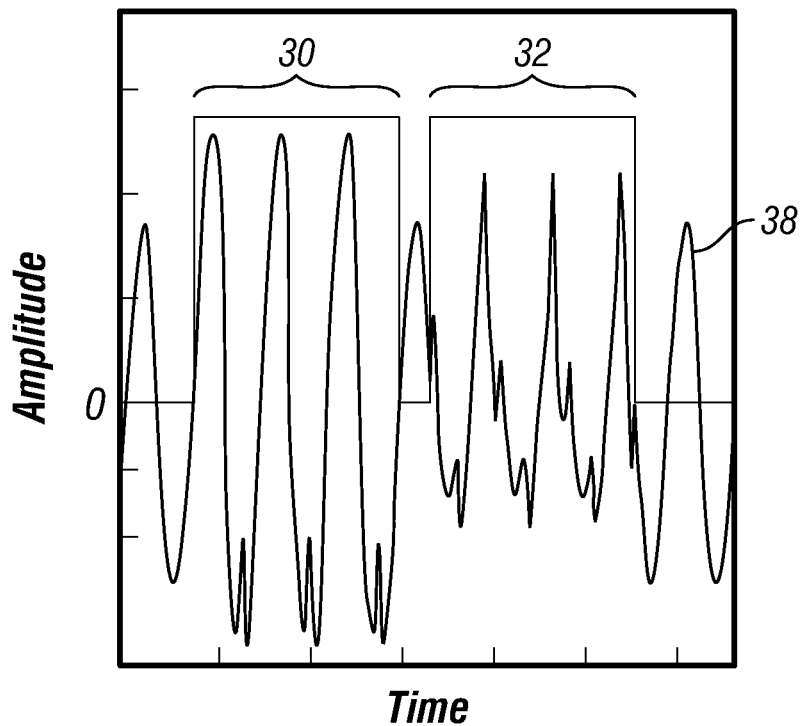
FIG. 4 shows an example graph combining the swell- and source-generated signals of FIGS. 2 and 3.

FIG. 4 shows an example graph of an EM signal 38 that includes the hypothetical swell-induced portion 26 from FIG. 2 and the hypothetical source-induced portion 34 of FIG. 3. Due to combination with the swell-induced portion 26 of FIG. 2, the combined signal 38 of FIG. 3 includes more noise than the smoother source-induced portion 34 of FIG. 3. As previously mentioned, the swell-induced portion 26 of FIG. 3 in the successive source-on time frames, the first source-on time frame 30 and the second source-on time frame 32, is approximately 180-degrees out of phase. Accordingly, the swell-induced noise can be suppressed by averaging of the EM signal 38 from the two time frames. In other words, the swell-induced portion of the combined signal 38 can be cancelled out by stacking, of the combined signal 38.

Figure 5:
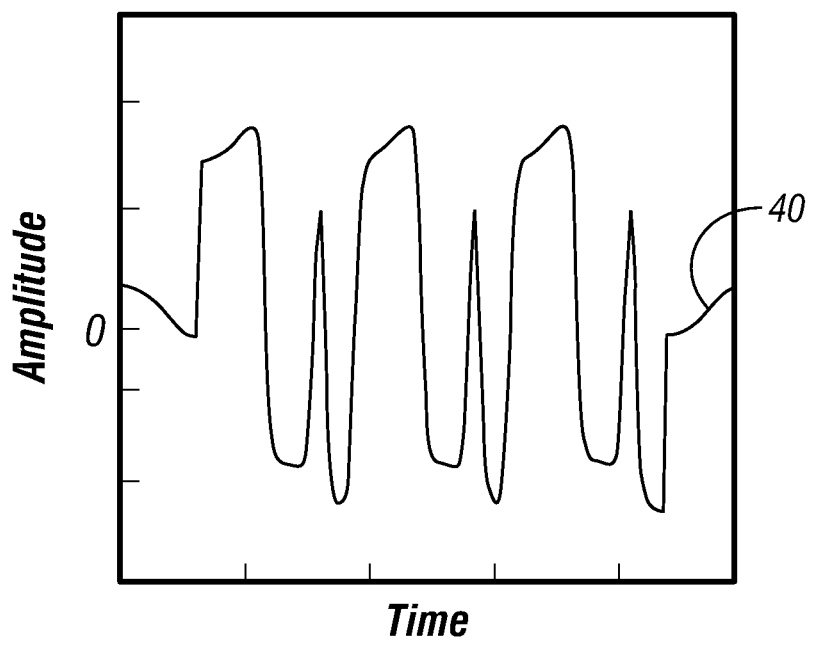
FIG. 5 shows an example graph of the stacked signal after averaging two time frames in accordance with embodiments of the present invention.

FIG. 5 shows an example graph of a stacked signal 40 after averaging the EM signal 38 of the first source-on time frame 30 and the second source-on time frame 32. Because the swell-induced portion of the EM signal 38 is approximately 180-degrees out of phase between the successive time frames, the swell-induced noise may be suppressed. As seen in FIG. 5, the stacked signal 40 more closely represents the hypothetical source-induced portion 34 of FIG. 3 than the EM signal 38 of FIG. 4, thus indicating that the swell-induced portion 26 has been effectively suppressed. It should be noted that stacking several successive source-on time frames may fail if the swell signal is "perfect" as shown on FIG. 2 and coinciding with one frequency component. The swell-induced noise may be "perfect," for example, where the swell-induced noise has a fixed constant period and amplitude even where each swell wave may differ from one another. However, swell-induced noise is generally not perfect. Observed swell-induced noise may be modulated so that the amplitude in the time domain varies. Accordingly, the processing technique described above should improve the data in accordance with present embodiments. In some embodiments, the frequencies for the EM source signal should not match the measured swell period, which can be monitored and adjusted onboard the survey vessel as needed.

However, as previously mentioned, embodiments of the present technique may not be particularly effective; for example, in circumstances when the swell signal is in-phase between successive source-on time frames, the swell-induced noise may not cancel out. Accordingly, an additional method for suppressing swell-induced noise may include adjusting the start of the source sequence for each source-on time frame to obtain successive source-on time frames with the swell signal 180-degrees out of phase. In real-time, the adjustment may be performed by a process that includes determining the phase of the swell-induced portion of the EM signal from the time frame, either with the source current present or during a period when the source is off. When the phase of the swell-induced portion is determined, the start of the current source sequence for the next source-on time frame may be delayed and triggered to achieve the 180-degree phase difference. In embodiments, the swell period may be from about 10 seconds to about 20 seconds. Accordingly, the delay may be a fraction of the swell period, for example, about 20 seconds or less, about 10 seconds or less. In some embodiments, the delay may be about 5 seconds or less.

Figure 6:
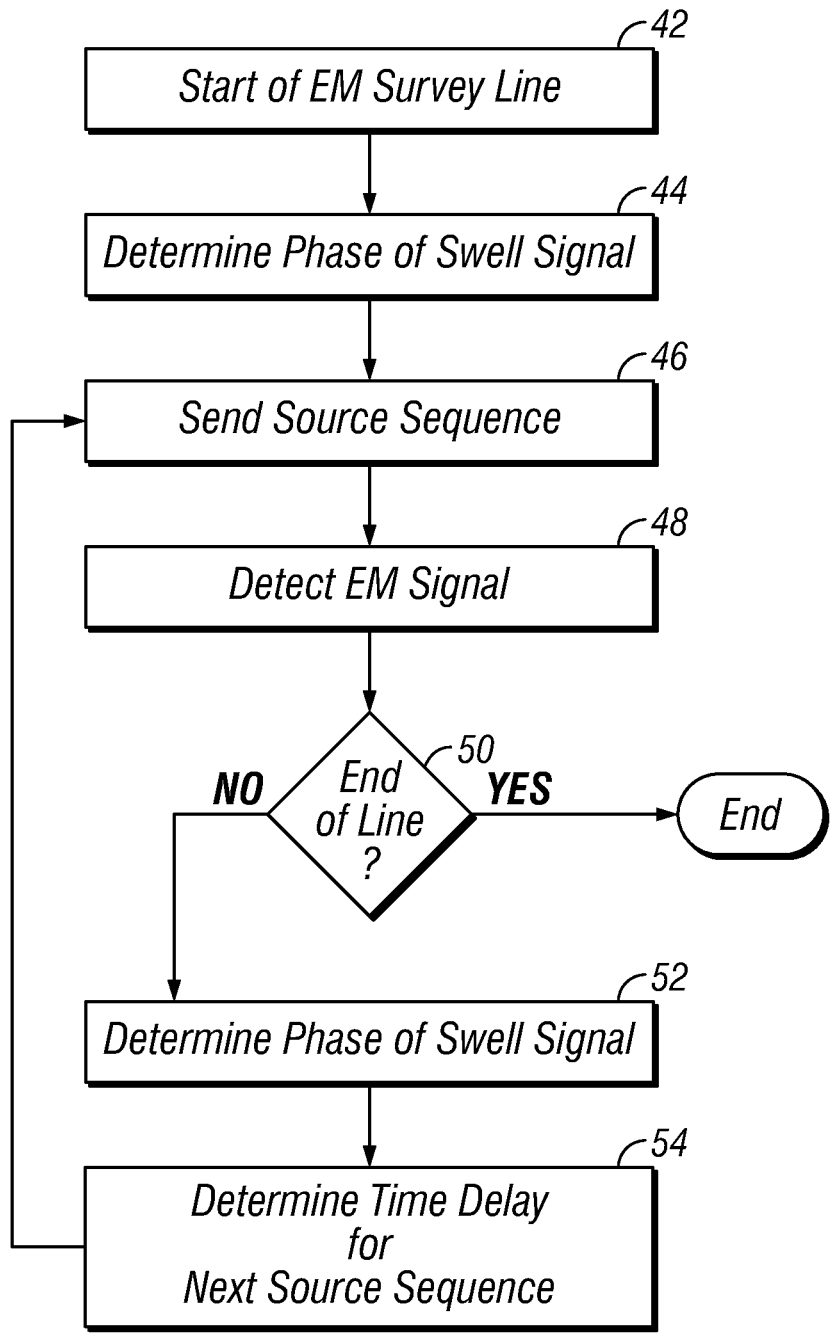
FIG. 6 shows a flow chart of one example method in accordance with embodiments of the present invention.

FIG. 6 illustrates arm example method for adjusting the start of the source sequence in a technique for suppression of swell-induced noise. An EM survey line may be started at 42. The EM survey line may include the line traveled by the survey vessel (e.g., survey vessel 4 of FIG. 1) for the EM survey and, thus, starting the EM survey line may include the survey vessel traveling along the survey path. The phase of the swell-induced portion of the EM signal may be initially determined at 44. The initial determination may be determined using measured data from EM sensors (e.g., EM sensors 20 of FIG. 1) taken either when the EM energy source (e.g., EM energy source 12 of FIG. 1) is on or during a period when the source is off. This initial determination of the phase of the swell-induced portion may be used to determine, for example, if swell-induced noise is a significant problem that will require suppression. This initial determination may also be used, for example, to determine an initial estimate for delay of the next time frame. At 46, a source sequence may then be sent to the EM energy source. The source sequence may be sent that turns the EM energy source on for a specified time period, thus defining a source-on time frame. As previously mentioned, turning the EM energy source may generated an EM field that propagates through rock formations below the water bottom. An EM signal may then be detected at 48 that is a result of the interaction of the induced EM field with the rock formations, such as rock formations 14 of FIG. 1. At 50, it is determined, if the EM survey is at the end of the line. If the EM survey is at the end of the line, as a non-limiting example, then the process may end. If the EM survey is not at the end of the line, the phase of the swell-induced portion in the detected EM signal detected may be determined at 52. The phase of the swell signal may be determined by processing the EM signal that was detected for the source-on time frame to determine its phase. With the phase known, a time delay for the next source sequence may be determined at 54. The next source sequence may be delayed an amount of time so that the swell signal for the next source-on time frame will be 180-degrees out of phase for the preceding source-on time frame, which should enable suppression of swell-induced noise by stacking. After the time delay, the process may then be returned to 46 to send another source sequence. Embodiments of the techniques shown on FIG. 6 may use a computer system (e.g., computer system 62 of FIG. 8) for implementing one or more steps of the illustrated method.

Figure 7:
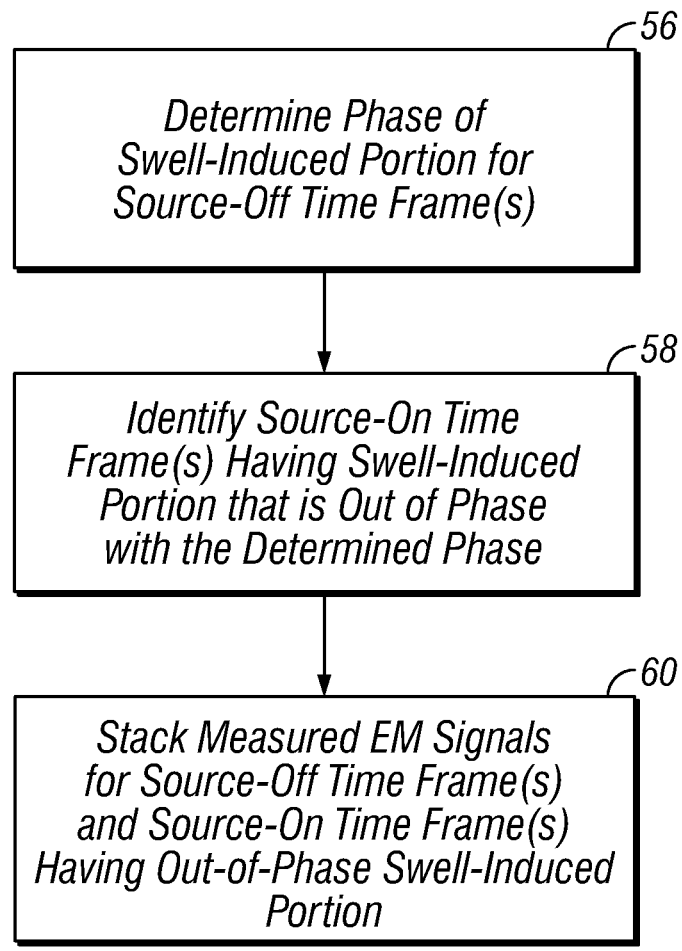
FIG. 7 shows a flow chart of another example method in accordance with embodiments of the present invention.

FIG. 7 illustrates another embodiment that may be used for suppressing swell-induced noise. In an embodiment, the illustrated embodiment may be used in the processing of measured EM data for the suppression of swell-induced noise. At 56, the phase of the swell-induced portion of an EM signal may be determined for one or more source-off time frames. This determination may be performed, for example, for one or more time frames when the EM energy source (e.g., EM energy source 12 of FIG. 1) is not on and, thus, not generating an EM field. One or more source-on time frames having a swell-included portion that is out of phase with the determined phase for the source-off time frames may then be identified at 58. In some embodiments, the swell-induced portion for the one or more source-off time frames and the one- or more source-on time frames may be 180-degrees out of phase. This determination may include comparing the swell-induced portion for source-on time frames with the swell-induced portion for source-off time frames to determine if they are out of phase. At 60, the measured EM signals for the one or more source-on time frames may then be stacked with the one or more source-off time frames with a swell-induced portion that is out of phase. Preferably, the source-on time frames may be stacked with out-of-phase swell-induced portions from near-by source-off time frames, for example, those time frames within a time frame that is shorter than the time over the target, typically not more than 2-4 time frames away. As previously described, the swell signal may, in effect, cancel itself out, for example, where the swell-induced portion of the source-on time frame is 180-degrees out of phase with swell-induced portion for the source-off time frame. Embodiments of the techniques shown on FIG. 7 may use a computer system (e.g., computer system 62 of FIG. 8) for implementing one or more steps of the illustrated method.

Figure 8:
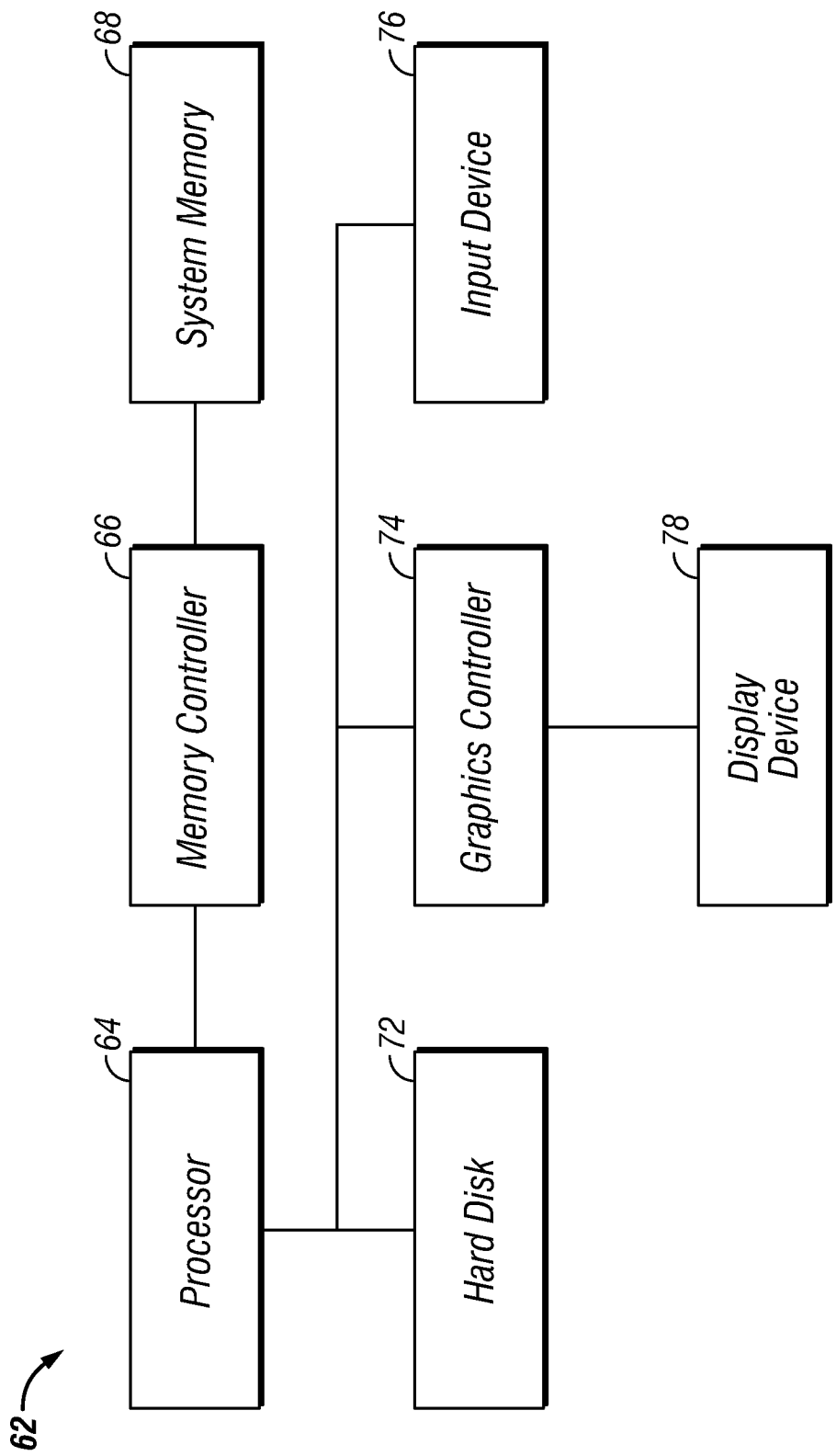
FIG. 8 shows an example of a computer system that may be used for implementing methods of the present invention.

FIG. 8 illustrates one embodiment of a computer system 62 that may be utilized in accordance with embodiments of the present invention. In some embodiments, the computer system 62 may be a component of the recording system (e.g., recording system 8 of FIG. 1). The computer system 62 may be used for implementing one or more methods of the present invention. The computer system 62 may receive as inputs, for example, the measured EM data and output the time delay for the next source sequence and/or an actuation signal for the EM energy source 12. In some embodiments, the computer system 62 may receive and display the measured EM signals and/or the stacked. EM signals, for example. Special or unique software for receiving the inputs, data processing, and sending output signals may be stored in the computer system 62 and/or on external computer readable media. Those of ordinary skill in the art will appreciate that the computer system 62 may comprise hardware elements including circuitry, software elements including computer code stored on a machine-readable medium or a combination of both hardware and software elements. Additionally, the blocks shown on FIG. 8 are but one example of blocks that may be implemented. A processor 64, such as a central processing unit or CPU, may control the overall operation of the computer system 62. The processor 64 may be connected to a memory controller 66, which may read data to and writes data from a system memory 68. The memory controller 66 may have memory that includes a non-volatile memory region and a volatile memory region. The system memory 68 may be composed of a plurality of memory modules, as will be appreciated by one of ordinary skill in the art. In addition, the system memory 68 may include non-volatile and volatile portions. A system basic input-output system (BIOS) may be stored in a non-volatile portion of the system memory 68. The system BIOS is adapted to control a start-up or boot process and to control the low-level operation of the computer system 62.

The processor 64 may be connected to at least one system bus 70 to allow communication between the processor 64 and other system devices. The system bus 70 may operate under a standard protocol such as a variation of the Peripheral Component Interconnect (PCI) bus or the like. In the example embodiment shown in FIG. 8, the system bus 70 connects the processor 64 to a hard disk drive 72, a graphics controller 74 and at least one input device 76. The hard disk drive 72 provides non-volatile storage to data that may be used by the computer system 62. The graphics controller 74 may be in turn connected to a display device 78, which may provides an image to a user based on activities performed by the computer system 62. The memory devices of the computer system 62, including the system memory 6 and the hard disk 72 may be tangible, machine-readable media that store computer-readable instructions to cause the processor 64 to perform a method according to an embodiment of the present techniques.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning, unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed:

1. A method for suppressing swell-induced noise in an electromagnetic survey, comprising:
    obtaining a measurement of an electromagnetic field parameter at one or more positions to provide an electromagnetic signal;
    determining a phase of a first time frame of the electromagnetic signal, wherein the first time frame has a swell-induced portion;
    identifying one or more additional time frames of the electromagnetic magnetic signal that are out of phase with the phase of the first time frame, wherein the one or more additional time frames have swell-induced portions; and
    stacking the first time frame of the electromagnetic signal and the one or more additional time frames of the electromagnetic signal.

2. The method of claim 1, wherein the electromagnetic field parameter comprises voltage.

3. The method of claim 1, wherein the step of stacking the first time frame of the electromagnetic signal and the one or more additional time frames of the electromagnetic signal comprises averaging two or more time frames of the electromagnetic signal.

4. The method of claim 1, wherein the swell-induced portion in the first time frame of the electromagnetic signal and the swell-induced portions of the one or more additional time frames of the electromagnetic signal are 180-degrees out of phase.

5. The method of claim 1, further comprising using a computer system to perform the step of stacking.

6. The method of claim 1, further comprising towing a sensor streamer through a body of water, wherein the one or more positions are located on the sensor streamer.

7. The method of claim 1, further comprising displaying an image of the stacked signal on a display device.

8. The method of claim 1, further comprising adjusting a start of a source sequence sent to at least one electromagnetic energy source such that the electromagnetic signal contains successive source-on time frames with the swell-induced portion being 180-degrees out of phase.

9. A method for suppressing swell-induced noise in an electromagnetic survey, comprising:
   measuring an electromagnetic field parameter at one or more positions to provide an electromagnetic signal, the electromagnetic signal comprising a swell-induced portion;
   stacking two or more frames of the electromagnetic signal to provide a stacked signal in which the swell-induced portion is suppressed, wherein the swell-induced portion is out of phase between the two or more frames;
   determining a phase of the swell-induced portion for one or more source-off time frames; and
   identifying one or more source-on time frames having a swell-induced portion that is out of phase with the determined phase of the swell-induced portion for the one or more source-off time frames;
   wherein the stacking two or more time frames comprises stacking the electromagnetic signal for the one or more source-on time frames and the one or more source off time frames.

10. A method for suppressing swell-induced noise in an electromagnetic survey, comprising:
    sending a first source sequence to at least one electromagnetic energy source to cause the electromagnetic energy source to generate an electromagnetic field;
    detecting an electromagnetic signal for the first source sequence;
    determining phase of a swell-induced portion in the electromagnetic signal for the first source sequence;
    determining a time delay for sending a second source sequence to the electromagnetic energy source such that the swell-induced portion in the electromagnetic signal for the second source sequence is 180-degrees out of phase with the phase of the swell-induced portion in the electromagnetic signal for the first source sequence;
    sending the second source sequence to the electromagnetic energy source after the time delay; and
    detecting the electromagnetic signal for the second source sequence.

11. The method of claim 10, further comprising stacking the electromagnetic signal for the first source sequence and the electromagnetic signal for the second source sequence to provide a stacked signal.

12. The method of claim 10, wherein the stacking comprising averaging the electromagnetic signal for the first source sequence and the electromagnetic signal for the second source sequence.

13. The method of claim 10, wherein the time delay is 20 seconds or less.

14. The method of claim 10, wherein the time delay is 5 seconds or less.

15. The method of claim 10, further comprising towing a sensor streamer through a body of water, wherein the electromagnetic signal for the first source sequence and the electromagnetic signal for the second source signal are detected at one or more positions are located along the sensor streamer.

16. The method of claim 15, further comprising towing the electromagnetic energy source through the body of water.

17. An electromagnetic survey system, comprising:
    an electromagnetic energy source;
    a sensor streamer, the sensor streamer comprising a plurality of longitudinally spaced electromagnetic sensors; and
    a computer system configured to at least: (i) receive an electromagnetic signal detected by one or more of the electromagnetic sensors, (ii) determine a phase of a first time frame of the electromagnetic signal, wherein the first time frame has a swell-induced portion; (iii) identify one or more additional time frames of the electromagnetic magnetic signal that are out of phase with the phase of the first time frame, wherein the one or more additional time frames have swell-induced portions; and (iv) stack the first time frame of the electromagnetic signal and the one or more additional time frames of the electromagnetic signal.

18. The system of claim 17, wherein the computer system is further configured to adjust a start of a source sequence sent to the electromagnetic energy source such the electromagnetic signal contains successive source-on time frames with the swell-induced portion being 180-degrees out of phase.

19. The system of claim 17, wherein the computer system configured to stack to two or more frames is configured to average two or more time frames of the electromagnetic signal.

20. The system of claim 17, wherein the sensor streamer is configured to be towed through a body of water by a survey vessel.

* * * * *